United States Patent
Fukuda et al.

(10) Patent No.: US 10,917,181 B2
(45) Date of Patent: Feb. 9, 2021

(54) COMMUNICATION APPARATUS AND COMMUNICATION SYSTEM

(71) Applicant: SONY SEMICONDUCTOR SOLUTIONS CORPORATION, Kanagawa (JP)

(72) Inventors: Shinichi Fukuda, Kanagawa (JP); Osamu Kozakai, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/325,417

(22) PCT Filed: Jul. 11, 2017

(86) PCT No.: PCT/JP2017/025234
§ 371 (c)(1),
(2) Date: Feb. 14, 2019

(87) PCT Pub. No.: WO2018/051621
PCT Pub. Date: Mar. 22, 2018

(65) Prior Publication Data
US 2019/0215082 A1    Jul. 11, 2019

(30) Foreign Application Priority Data

Sep. 13, 2016 (JP) .................. 2016-178404

(51) Int. Cl.
*H04B 13/00* (2006.01)
(52) U.S. Cl.
CPC .................. *H04B 13/005* (2013.01)

(58) Field of Classification Search
CPC .................................................. H04B 13/005
See application file for complete search history.

(56) References Cited

U.S. PATENT DOCUMENTS

| | | | | |
|---|---|---|---|---|
| 2006/0052074 A1* | 3/2006 | Minotani | ............. | H04B 13/005 455/276.1 |
| 2007/0207753 A1* | 9/2007 | Byun | ....................... | H04B 1/18 455/193.1 |
| 2008/0261523 A1* | 10/2008 | Kubono | ............... | H04B 13/005 455/41.1 |

(Continued)

FOREIGN PATENT DOCUMENTS

| CN | 1751463 A | 3/2006 |
|---|---|---|
| CN | 102204134 A | 9/2011 |

(Continued)

OTHER PUBLICATIONS

International Search Report and Written Opinion of PCT Application No. PCT/JP2017/025234, dated Sep. 5, 2017, 8 pages of ISRWO.

*Primary Examiner* — Wen W Huang
(74) *Attorney, Agent, or Firm* — Chip Law Group

(57) ABSTRACT

A communication apparatus of the present disclosure includes: an antenna unit including a first electrode and a second electrode; a communication circuit unit that performs communication using a human body as a communication medium via the antenna unit; and a series circuit including a switch and a capacitor that are coupled to each other in series, and coupled between the first electrode and the second electrode.

9 Claims, 16 Drawing Sheets

(56) References Cited

U.S. PATENT DOCUMENTS

| | | | |
|---|---|---|---|
| 2010/0045446 A1* | 2/2010 | Hyun | H04B 13/005 |
| | | | 340/10.51 |
| 2011/0200150 A1 | 8/2011 | Fazzi et al. | |
| 2011/0269416 A1* | 11/2011 | Kadoi | H04B 1/0458 |
| | | | 455/127.2 |
| 2013/0135060 A1* | 5/2013 | Lee | H03H 7/40 |
| | | | 333/124 |
| 2013/0265026 A1* | 10/2013 | Kim | H04B 13/005 |
| | | | 323/293 |
| 2017/0125900 A1* | 5/2017 | Xu | H01Q 5/20 |

FOREIGN PATENT DOCUMENTS

| | | |
|---|---|---|
| EP | 1587226 B1 | 10/2007 |
| EP | 2356762 A1 | 8/2011 |
| JP | 2005-159480 A | 6/2005 |
| JP | 2007-166185 A | 6/2007 |
| JP | 2008-035570 A | 2/2008 |
| JP | 2012-507905 A | 3/2012 |
| JP | 2014-045393 A | 3/2014 |
| KR | 10-2006-0024340 A | 3/2006 |
| KR | 10-2011-0080173 A | 7/2011 |
| WO | 2005/060131 A1 | 6/2005 |
| WO | 2010/049842 A1 | 5/2010 |

\* cited by examiner

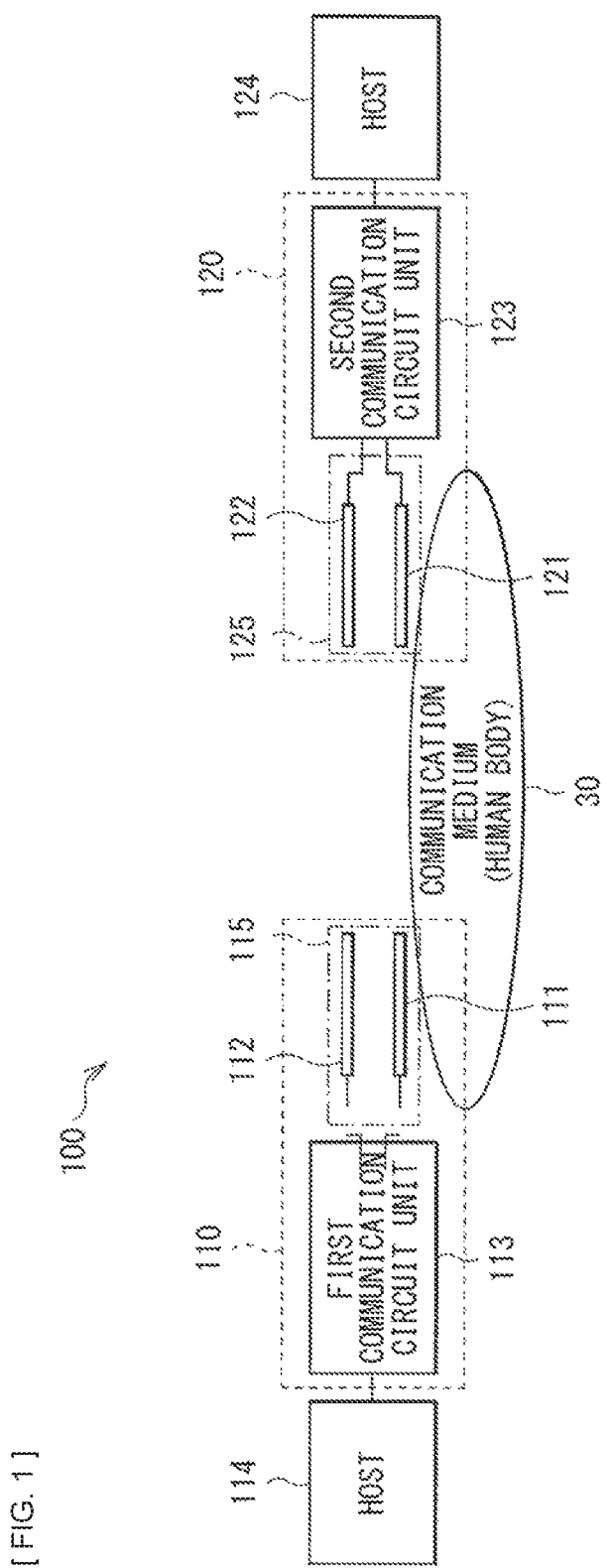
[FIG. 1]

[FIG. 2]
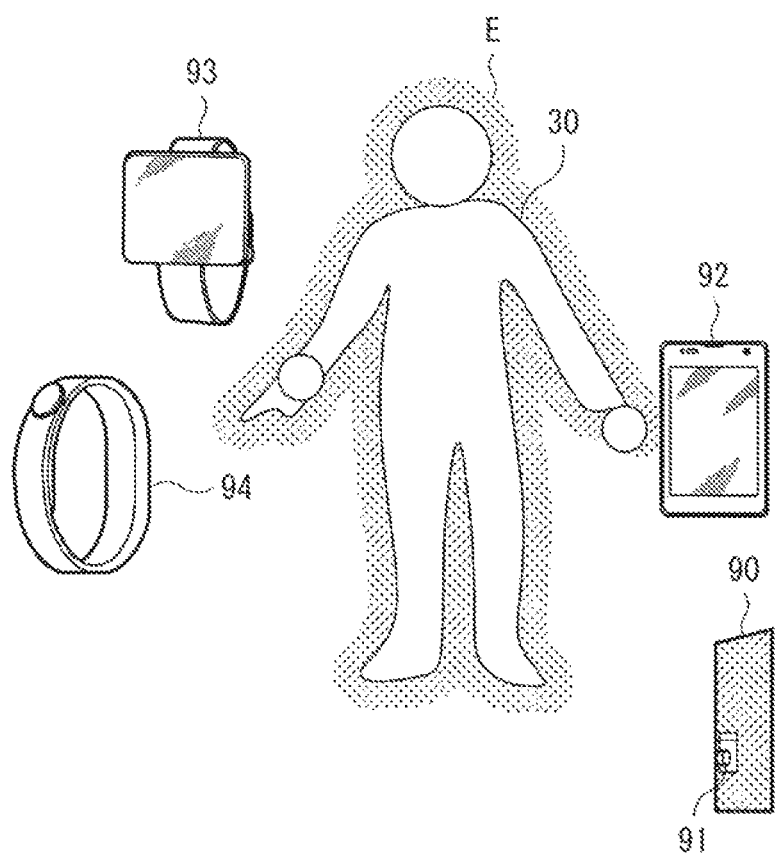

[FIG. 3]
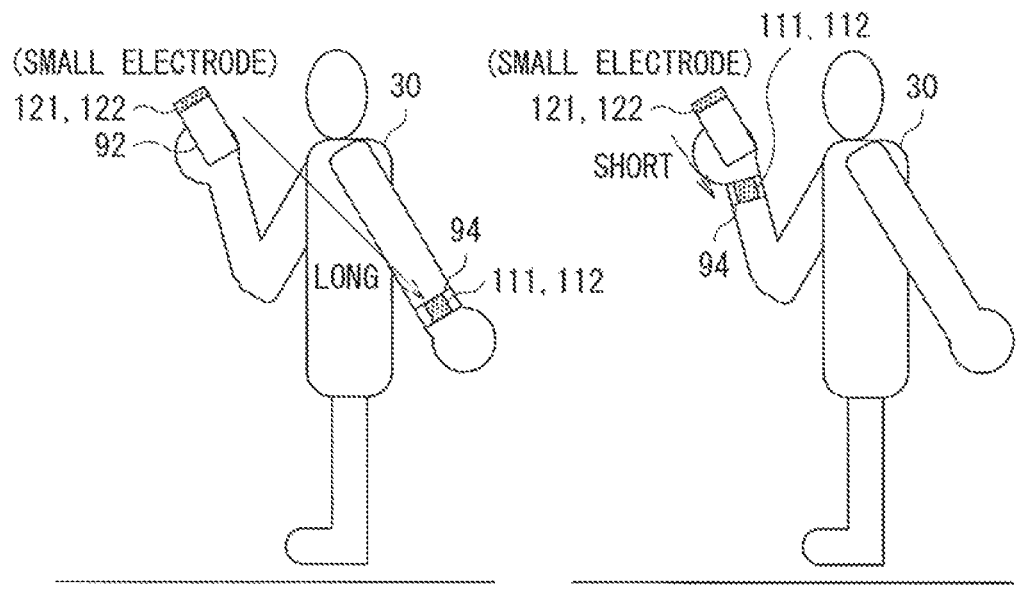
[FIG. 4]
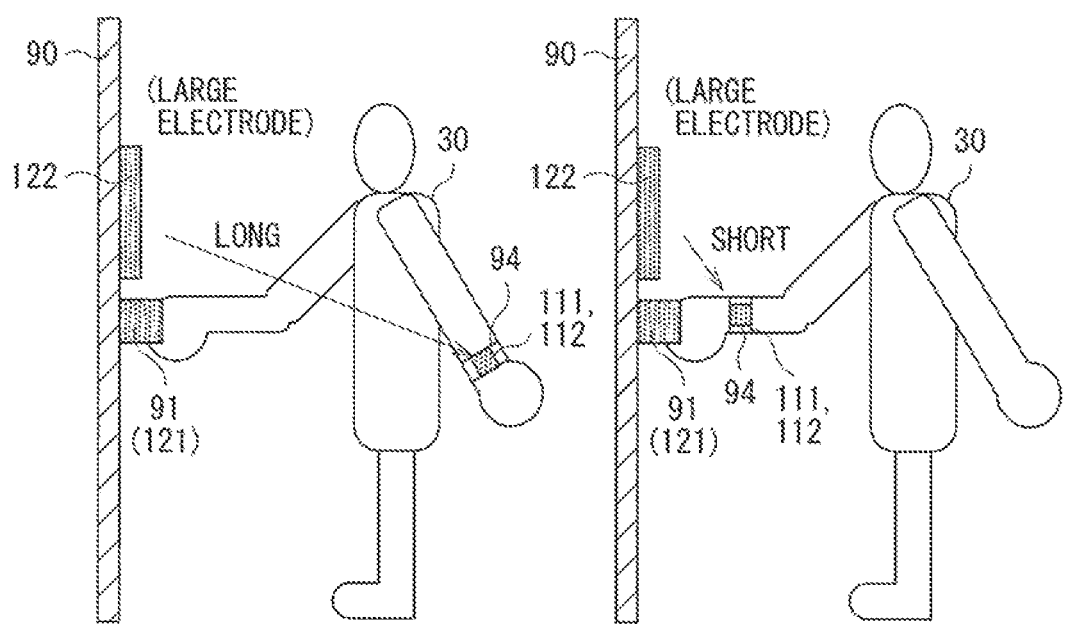

[FIG. 5]
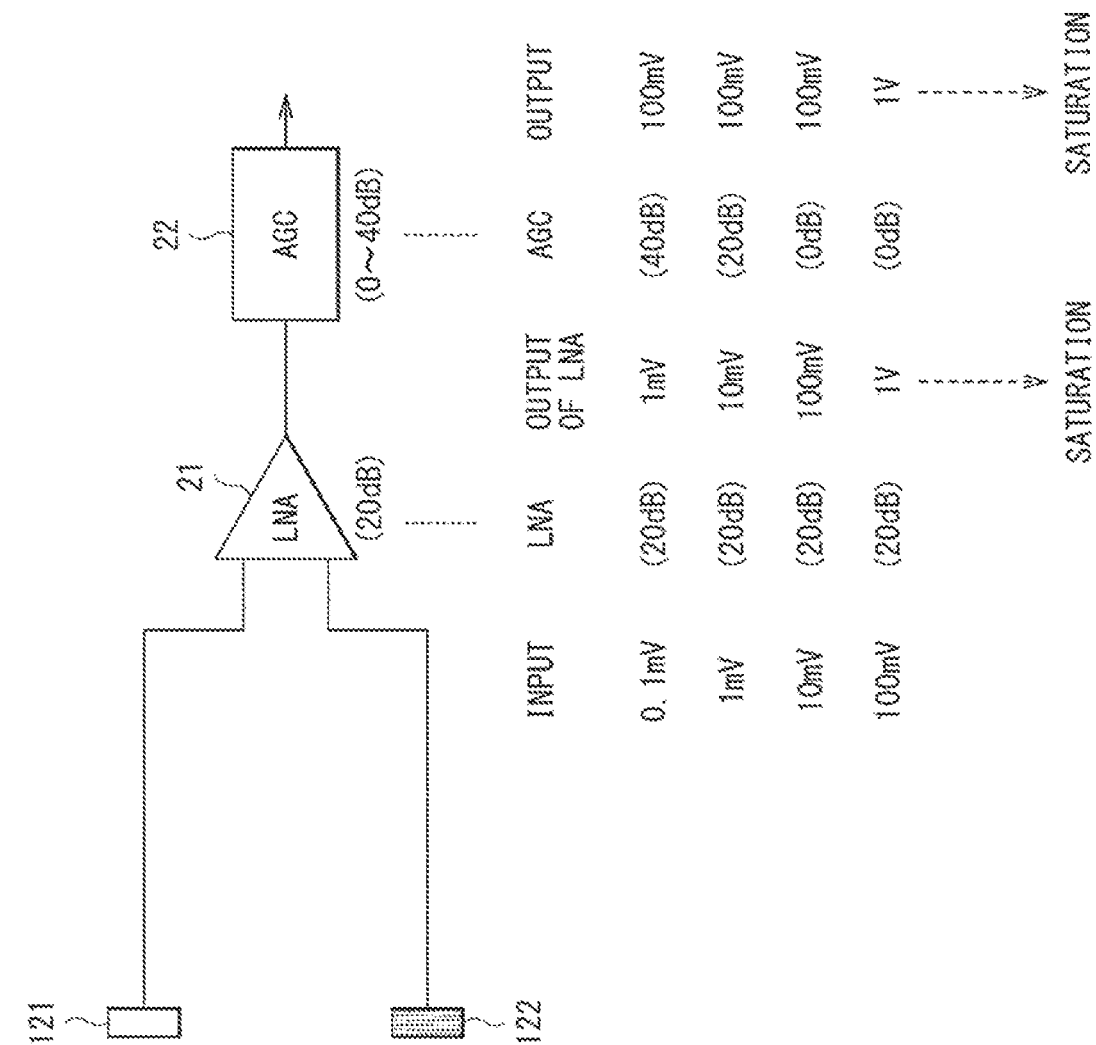

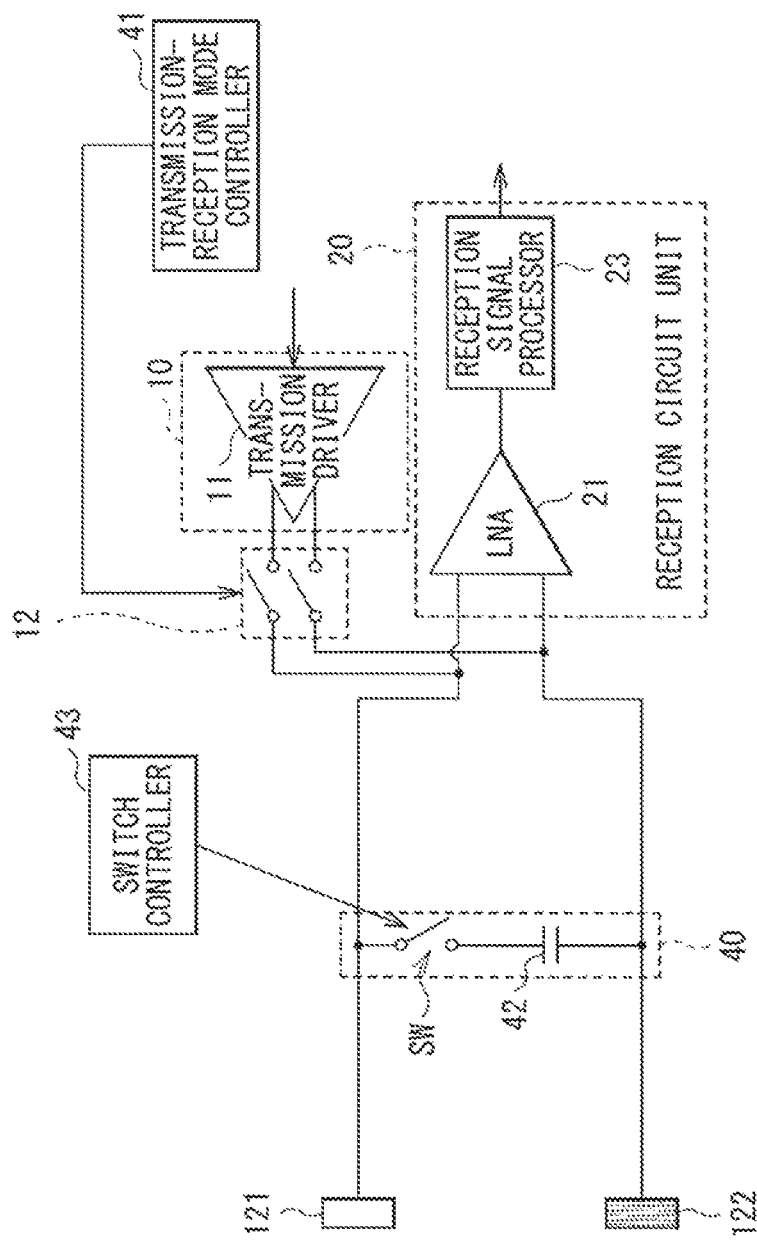
[FIG. 6]

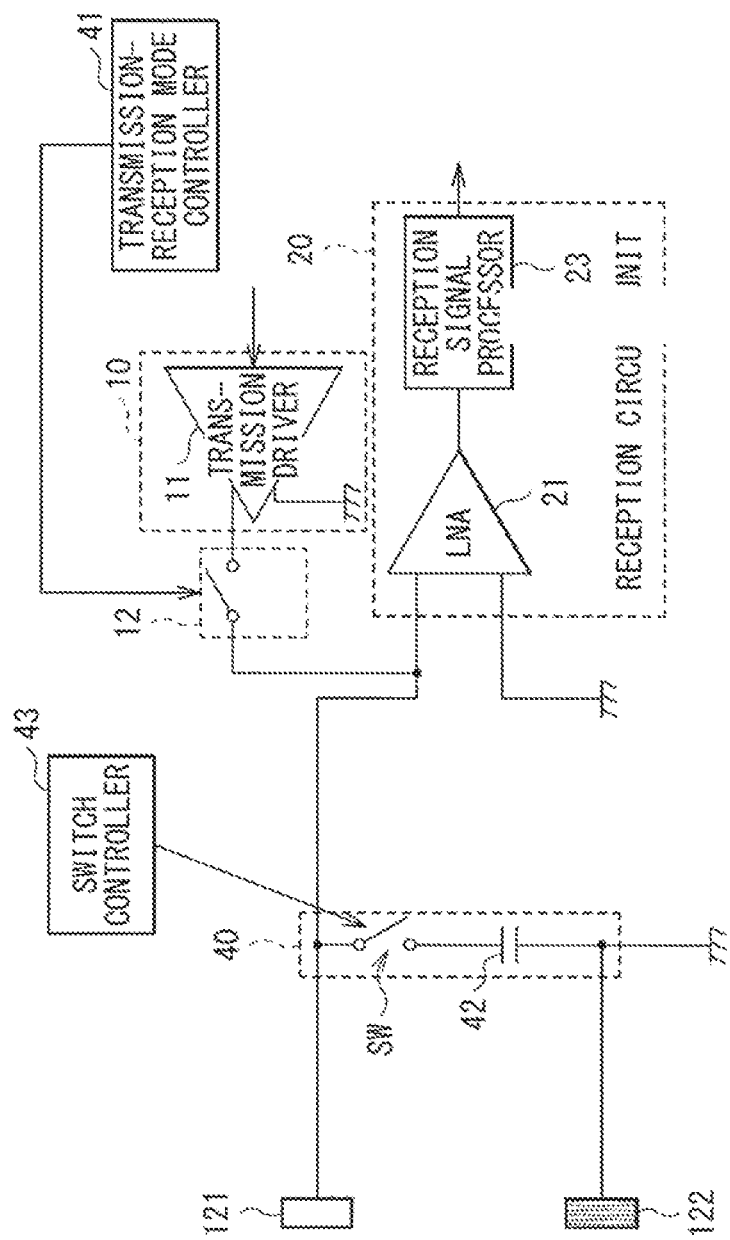
[FIG. 7]

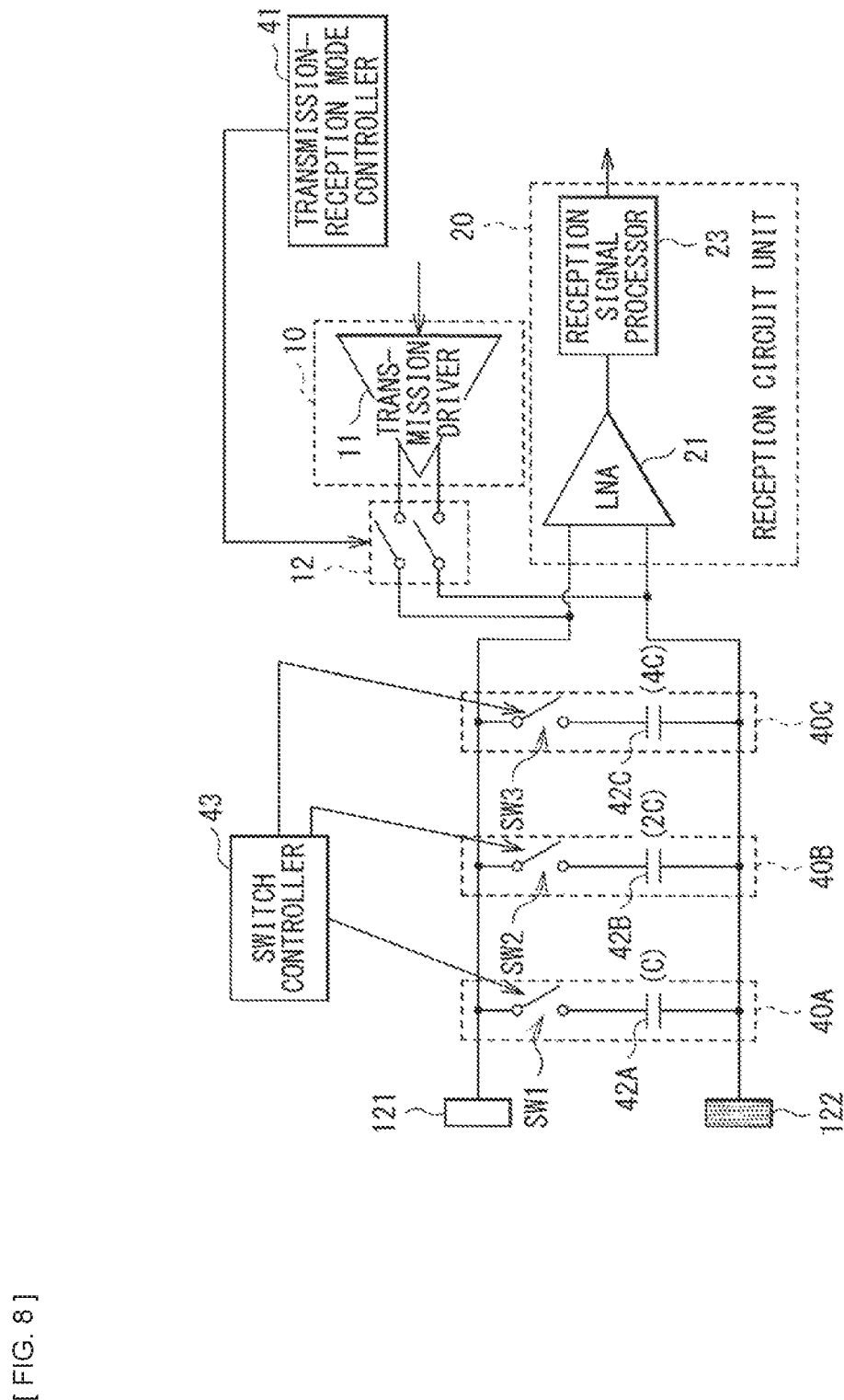
[FIG. 8]

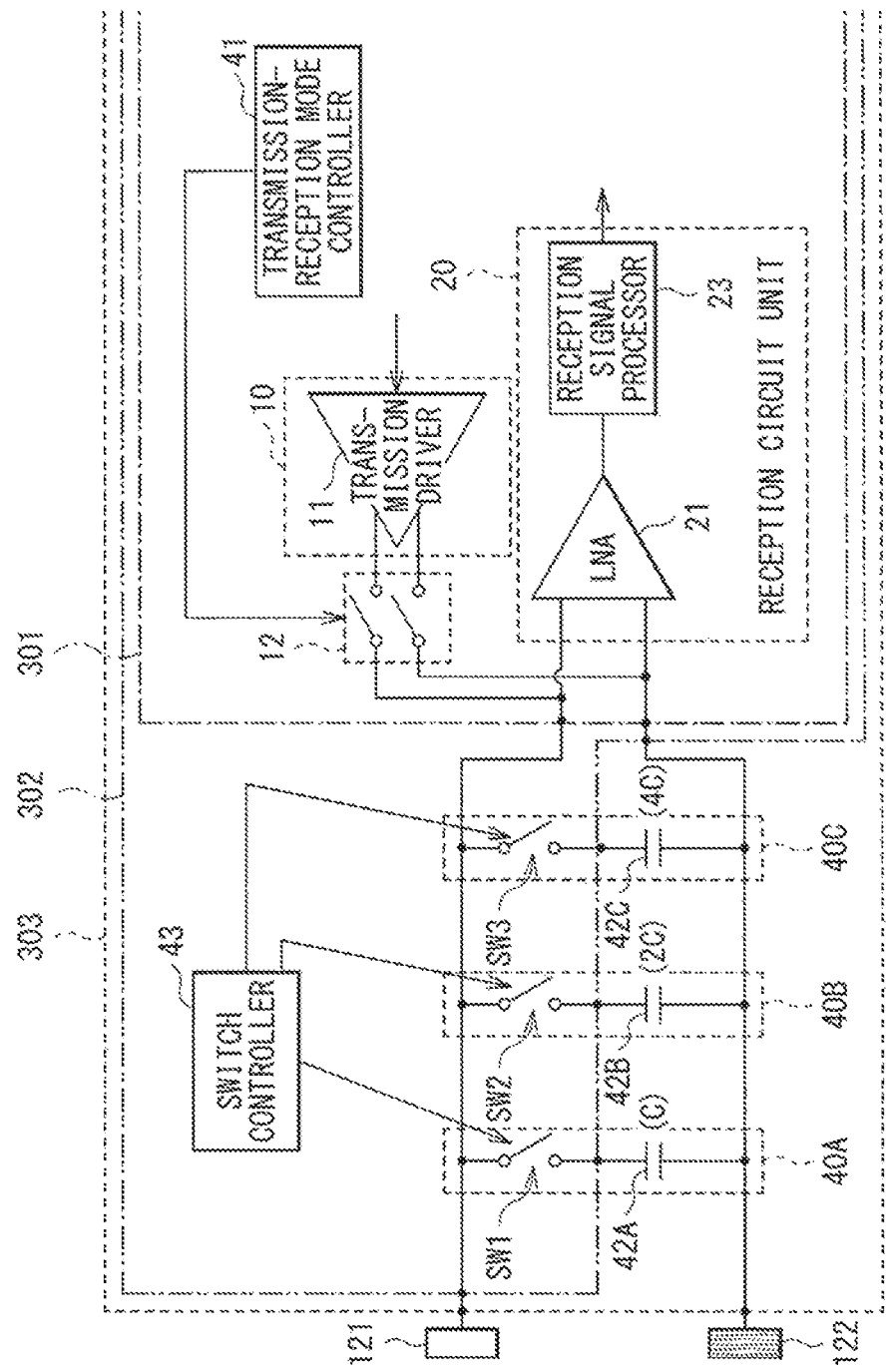
[FIG. 9]

[ FIG. 10 ]
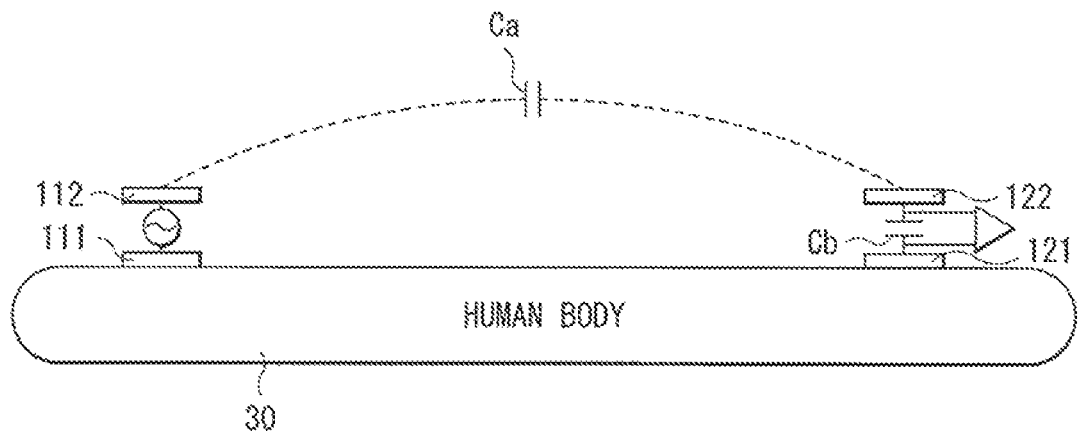
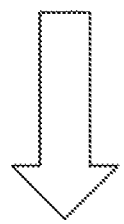
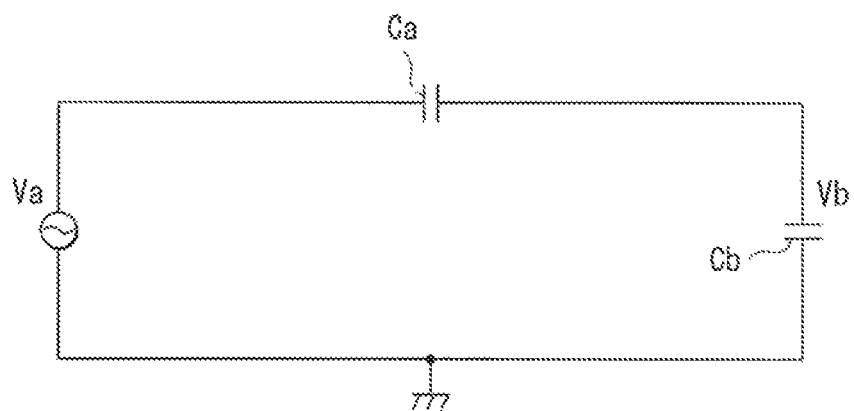

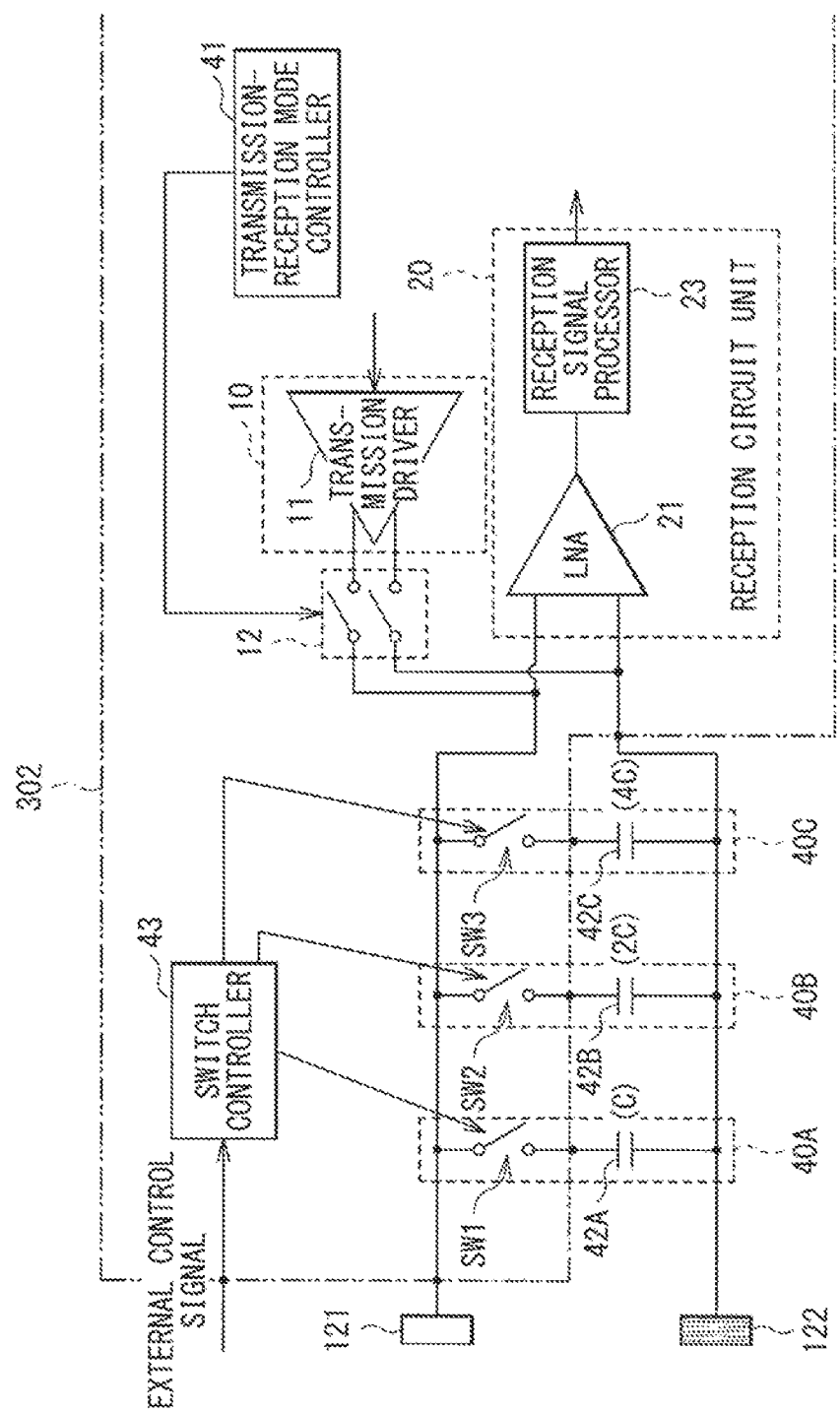
[FIG. 11]

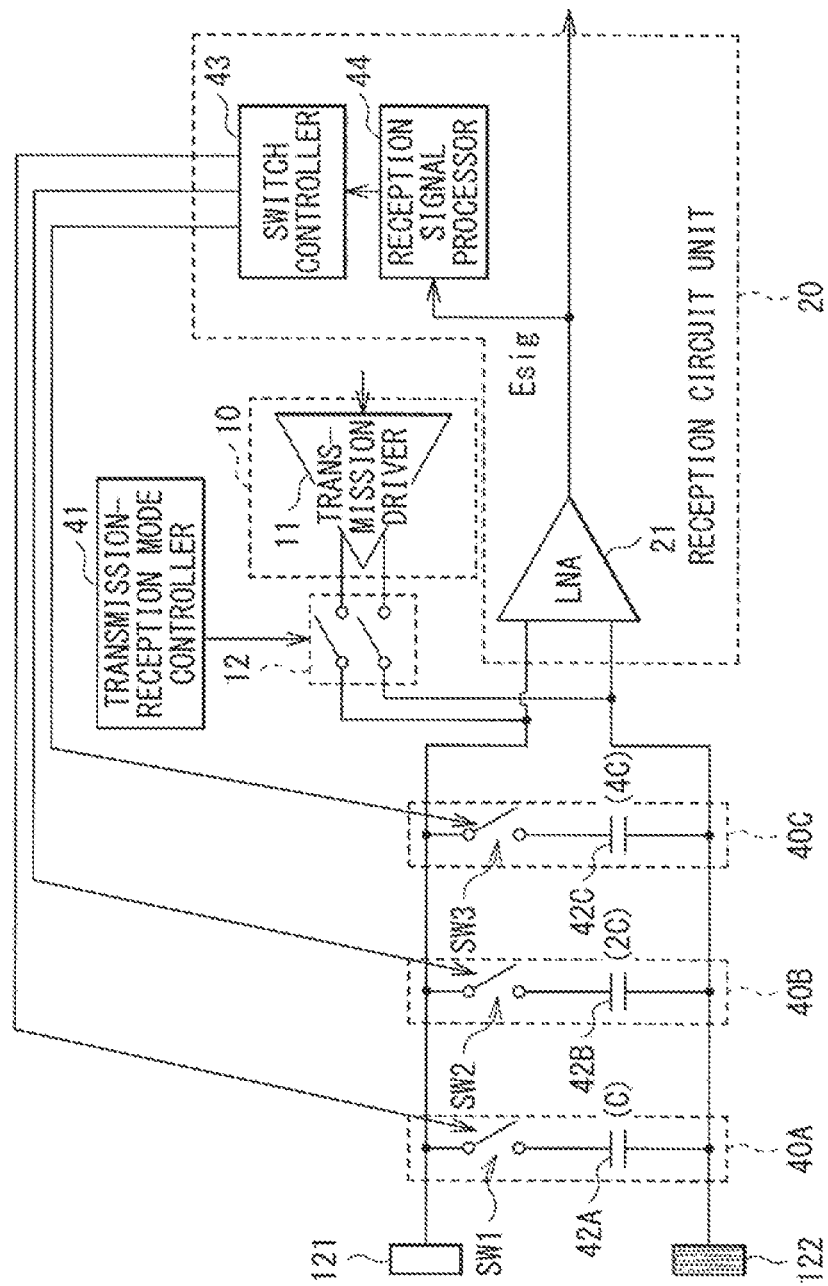
[FIG. 12]

[ FIG. 13 ]

| ssw (SWITCHING SETTING VALUE) | STATE OF SWITCH (ON: 1, OFF: 0) | | | CAPACITY VALUE |
|---|---|---|---|---|
| | SW3 | SW2 | SW1 | |
| 0 | 0 | 0 | 0 | 0 |
| 1 | 0 | 0 | 1 | C |
| 2 | 0 | 1 | 0 | 2C |
| 3 | 0 | 1 | 1 | 3C |
| 4 | 1 | 0 | 0 | 4C |
| 5 | 1 | 0 | 1 | 5C |
| 6 | 1 | 1 | 0 | 6C |
| 7 | 1 | 1 | 1 | 7C |

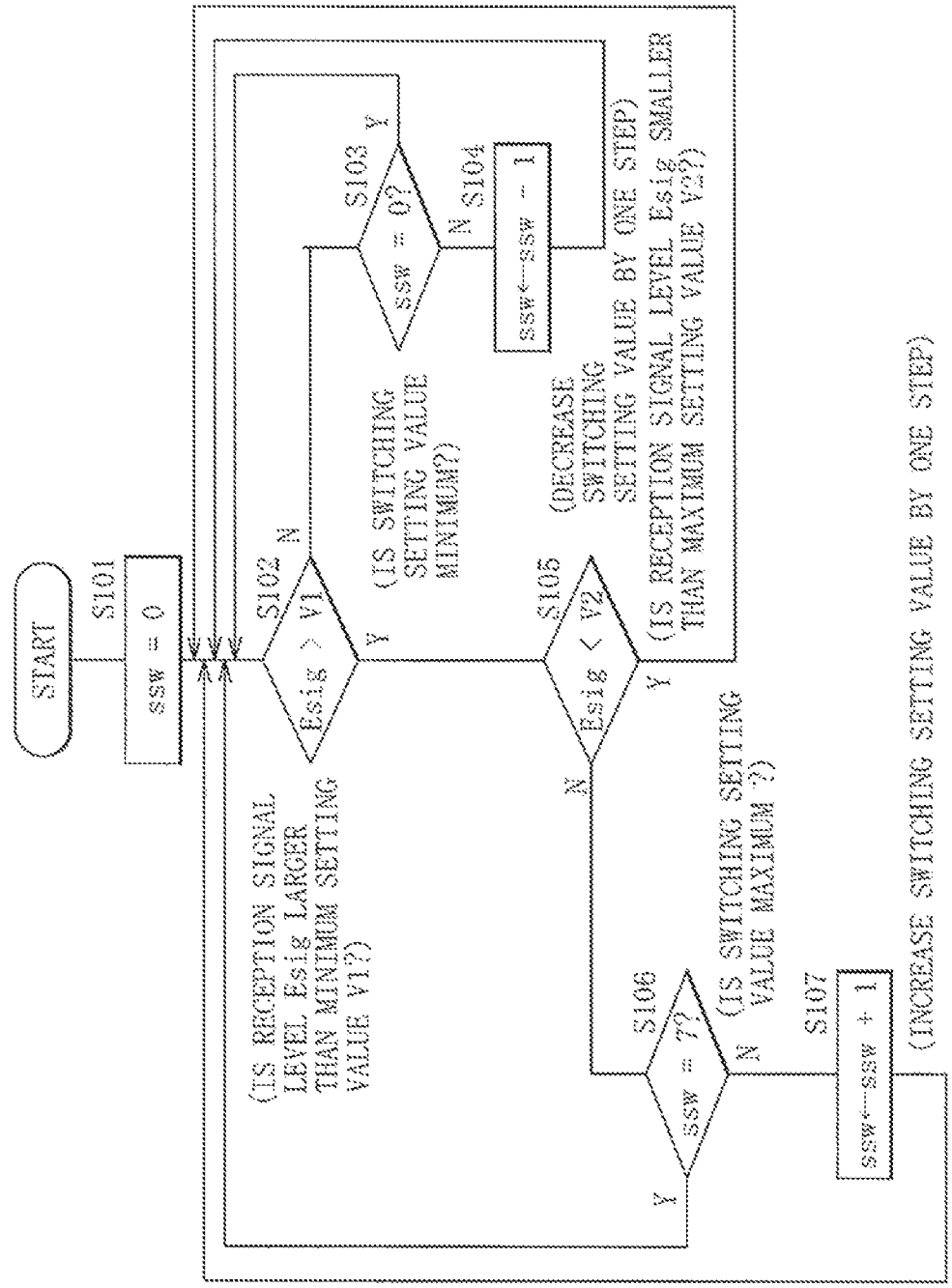
[FIG. 14]

[FIG. 15]
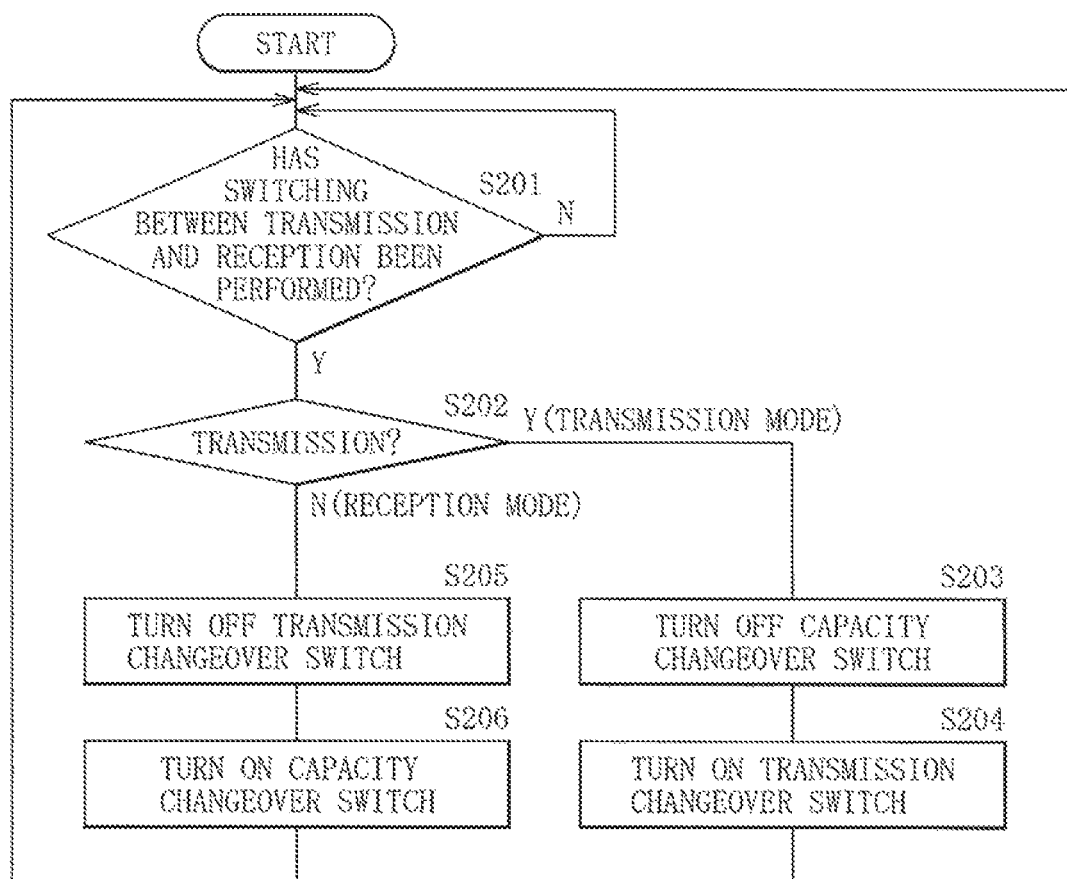

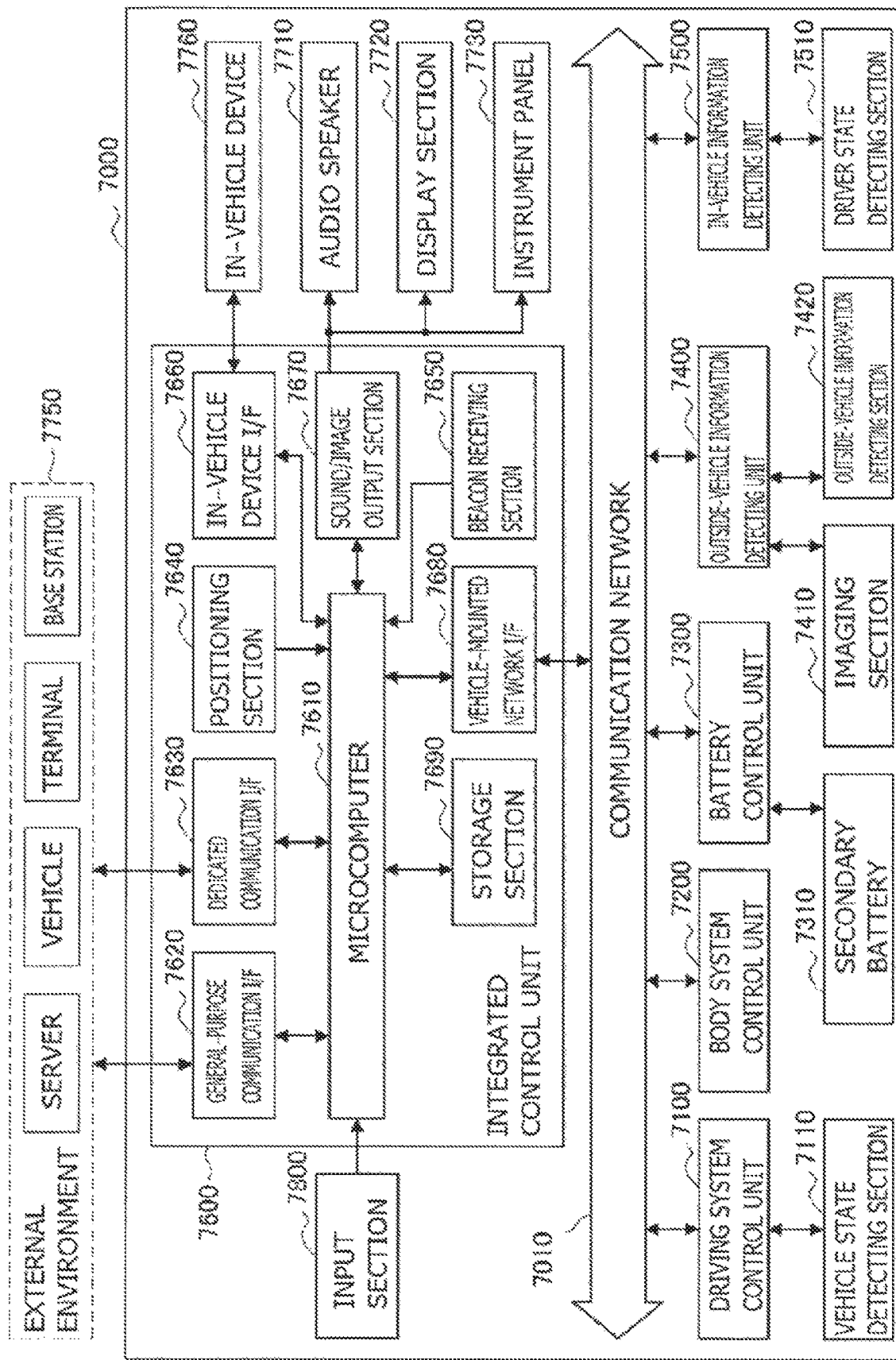
[FIG. 16]

[ FIG. 17 ]
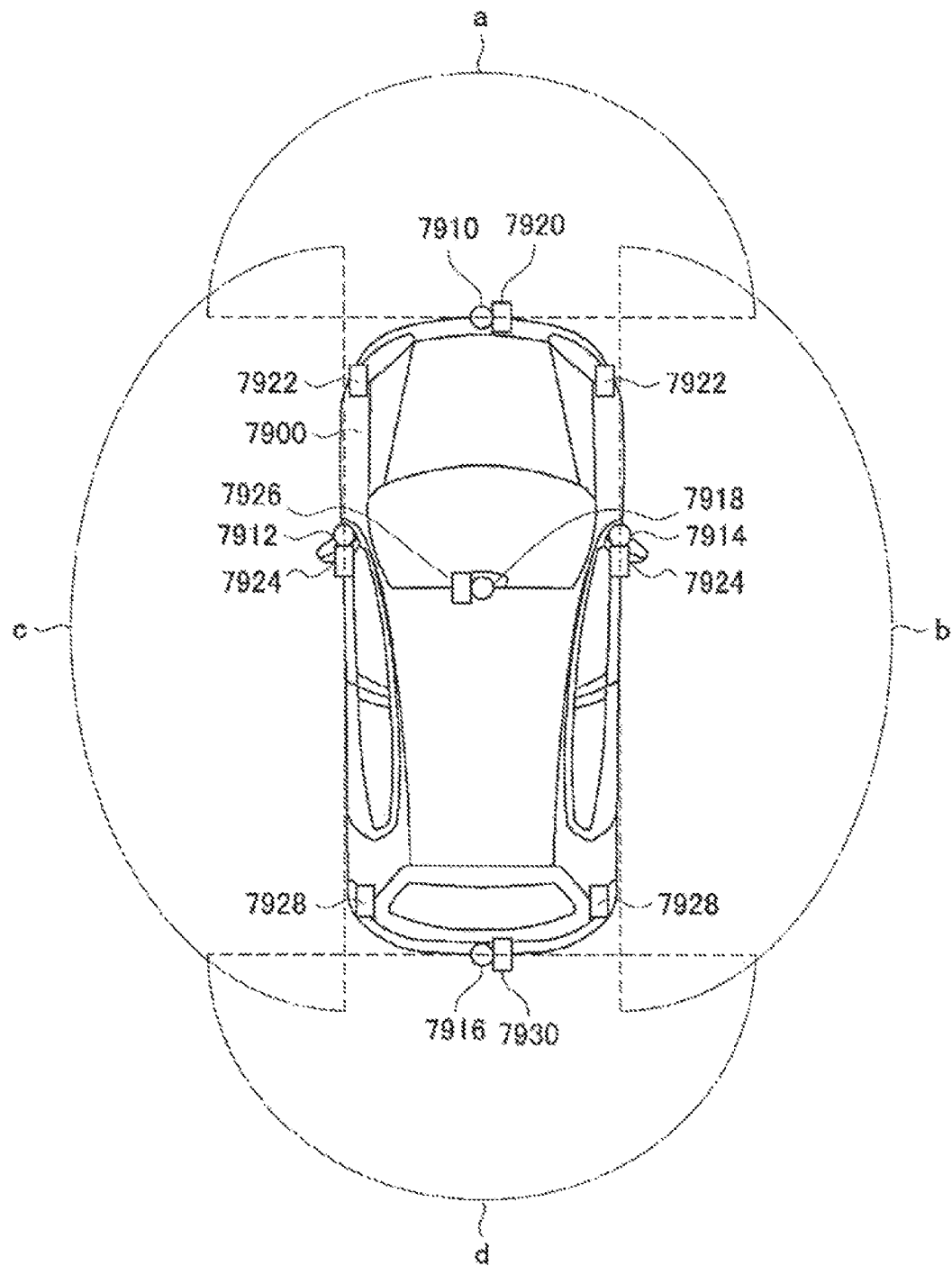

COMMUNICATION APPARATUS AND COMMUNICATION SYSTEM

CROSS REFERENCE TO RELATED APPLICATIONS

This application is a U.S. National Phase of International Patent Application No. PCT/JP2017/025234 filed on Jul. 11, 2017, which claims priority benefit of Japanese Patent Application No. JP 2016-178404 filed in the Japan Patent Office on Sep. 13, 2016. Each of the above-referenced applications is hereby incorporated herein by reference in its entirety.

TECHNICAL FIELD

The present disclosure relates to a communication apparatus and a communication system that are suitable for communication using a human body as a communication medium.

BACKGROUND ART

There is known a communication system using electric field communication technology that uses a human body as a communication medium.

CITATION LIST

Patent Literature

PTL 1: Japanese Unexamined Patent Application Publication No. 2007-166185
PTL 2: Japanese Unexamined Patent Application Publication No. 2014-45393

SUMMARY OF THE INVENTION

In a communication system using electric field communication technology, change in a communication environment may cause degradation in communication performance.

It is desirable to provide a communication apparatus and a communication system that make it possible to suppress degradation in communication performance due to change in a communication environment.

A communication apparatus according to an embodiment of the present disclosure includes: an antenna unit including a first electrode and a second electrode; a communication circuit unit that performs communication using a human body as a communication medium via the antenna unit; and a series circuit including a switch and a capacitor that are coupled to each other in series, and coupled between the first electrode and the second electrode.

A communication system according to an embodiment of the present disclosure includes: a first communication apparatus; and a second communication apparatus that performs communication using a human body as a communication medium with the first communication apparatus, and at least one of the first communication apparatus and the second communication apparatus includes: an antenna unit including a first electrode and a second electrode, a communication circuit unit that performs communication using a human body as a communication medium via the antenna unit, and a series circuit including a switch and a capacitor that are coupled to each other in series, and coupled between the first electrode and the second electrode.

The communication apparatus or the communication system according to the embodiment of the present disclosure, it is possible to selectively add a capacity between the electrodes configuring the antenna unit.

According to the communication apparatus or the communication system according to the embodiment of the present disclosure, it is possible to selectively add the capacity between the electrodes configuring the antenna unit, which makes it possible to suppress degradation in communication performance due to change in a communication environment.

It is to be noted that effects described here are not necessarily limited and may include any of effects described in the present disclosure.

BRIEF DESCRIPTION OF THE DRAWINGS

FIG. 1 is a configuration diagram illustrating an overview of a communication system according to a comparative example using a human body as a communication medium.

FIG. 2 is a configuration diagram illustrating the overview of the communication system according to the comparative example.

FIG. 3 is an explanatory diagram illustrating issues of the communication system according to the comparative example.

FIG. 4 is an explanatory diagram illustrating the issues of the communication system according to the comparative example.

FIG. 5 is an explanatory diagram illustrating the issues of the communication system according to the comparative example.

FIG. 6 is a block diagram schematically illustrating a first configuration example of a communication apparatus according to a first embodiment of the present disclosure.

FIG. 7 is a block diagram schematically illustrating a second configuration example of the communication apparatus according to the first embodiment.

FIG. 8 is a block diagram schematically illustrating a third configuration example of the communication apparatus according to the first embodiment.

FIG. 9 is a block diagram illustrating an example of a range of a circuit portion to be incorporated in an IC in the communication apparatus according to the first embodiment.

FIG. 10 is an explanatory diagram illustrating a relationship between a capacity value between electrodes and a reception signal level.

FIG. 11 is a block diagram schematically illustrating an example of control of capacity switching on the basis of an external control signal in the communication apparatus according to the first embodiment.

FIG. 12 is a block diagram schematically illustrating an example of control of capacity switching on the basis of the reception signal level in the communication apparatus according to the first embodiment.

FIG. 13 is an explanatory diagram illustrating a correspondence between states of capacity changeover switches and a capacity value in the communication apparatus according to the first embodiment.

FIG. 14 is a flow chart schematically illustrating an example of control of the reception signal level in the communication apparatus according to the first embodiment.

FIG. 15 is a flow chart schematically illustrating control of switching between a transmission mode and a reception mode in the communication apparatus according to the first embodiment.

FIG. 16 is a block diagram depicting an example of schematic configuration of a vehicle control system.

FIG. 17 is a diagram of assistance in explaining an example of installation positions of an outside-vehicle information detecting section and an imaging section.

MODES FOR CARRYING OUT THE INVENTION

In the following, some embodiments of the present disclosure are described in detail with reference to the drawings. It is to be noted that description is given in the following order.

0. Comparative Example (Overview and Issues of Communication System Using Human Body as Communication Medium) (FIGS. 1 to 5)
1. First Embodiment
1.1 Basic Configuration and Operation (FIGS. 6 to 10)
1.2 Control Operation (FIGS. 11 to 15)
1.3 Effects
2. Second Embodiment (Practical Application Example) (FIGS. 16 and 17)
3. Other Embodiments

0. Comparative Example (Overview of Communication System Using Human Body as Communication Medium)

FIGS. 1 and 2 illustrate an overview of a communication system according to a comparative example using a human body 30 as a communication medium with use of electric field communication technology.

A communication system 100 according to this comparative example includes a first communication apparatus 110 and a second communication apparatus 120.

For example, the communication system 100 is usable for communication between a communication apparatus mounted in a wearable device such as a smartwatch 93 and a wristband terminal 94 and a communication apparatus mounted in a doorknob 91 of a door 90, a smartphone 92, etc., as illustrated in FIG. 2. One of the first communication apparatus 110 and the second communication apparatus 120 may be provided in the smartwatch 93, etc., and the other may be provided in the smartphone 92, etc. Moreover, the communication system 100 is usable for unlocking of a door of an automobile, etc. For example, one of the first communication apparatus 110 and the second communication apparatus may be provided in a door of an automobile. Further, the communication system 100 is usable for not only unlocking of the door of the automobile but also unlocking of the door 90 having a locking function that is used to enter and leave a room, etc.

The first communication apparatus 110 includes a first antenna unit 115 and a first communication circuit unit 113. The first antenna unit 115 includes a first human body electrode 111 and a first spatial electrode 112 as communication electrodes. The first communication circuit unit 113 is coupled to a host 114.

The second communication apparatus 120 includes a second antenna unit 125 and a second communication circuit unit 123. The second antenna unit 125 includes a second human body electrode 121 and a second spatial electrode 122 as communication electrodes. The second communication circuit unit 123 is coupled to a host 124.

Each of the first communication circuit unit 113 and the second communication circuit unit 123 includes an electric field communication mode (quasi-electrostatic field communication mode) communication circuit.

The first communication circuit unit 113 may include at least a transmission circuit (a transmitter). The second communication circuit unit 123 may include at least a reception circuit (a receiver). Alternatively, each of the first communication circuit unit 113 and the second communication circuit unit 123 may include a transmission-reception circuit, which allows for bidirectional communication between the first communication apparatus 110 and the second communication apparatus 120.

In a case where a signal is transmitted from the first communication apparatus 110, the first communication circuit unit 113 generates, between the first human body electrode 111 and the first spatial electrode 112, a potential-difference transmission signal including a signal modulated by a predetermined modulation mode. The first human body electrode 111 is disposed closer to the human body 30 than the first spatial electrode 112. Hence, the first human body electrode 111 is disposed to have stronger electrostatic coupling with a communication medium (the human body 30) than the first spatial electrode 112.

In the communication system, a human body-side communication path using the human body 30 as a communication medium is formed between the first human body electrode 111 and the second human body electrode 121 by approach of a portion of the human body 30 closer to the second human body electrode 121 than to the second spatial electrode 122. Moreover, a space-side communication path using space (for example, air) as a communication medium is formed between the first spatial electrode 112 and the second spatial electrode 122.

A potential difference corresponding to a transmission signal to be transmitted via the human body-side communication path and the space-side communication path is generated between the second human body electrode 121 and the second spatial electrode 122. The second communication circuit unit 123 detects the potential difference generated between the second human body electrode 121 and the second spatial electrode 122, performs a demodulation process corresponding to the modulation mode of the first communication circuit unit 113 to generate a reception signal, and outputs the reception signal as an output signal.

In the electric field communication mode (the quasi-electrostatic field communication mode), strengthening coupling between human body electrodes of the first communication apparatus 110 and the second communication apparatus 120 makes it possible to perform communication. Contact of a human with the human body electrode makes it possible to perform communication, and only approach of the human to the human body electrode makes it possible to perform communication through distributing an electric field E onto a surface of the human body, as illustrated in FIG. 2. Hence, communication is enabled only in close proximity to the human body 30. The electric field communication mode has high compatibility with a wearable device.

(Issues)

In the communication system with use of the electric field communication technology as described above, communication performance may be degraded due to change in a communication environment.

For example, consideration is given to a case of wearing the wristband terminal 94 in which the first communication apparatus 110 is mounted and performing communication with the smartphone 92 in which the second communication apparatus 120 is mounted, as illustrated in FIG. 3. In this case, in a case where the smartphone 92 is held by a hand on side on which the wristband terminal 94 is worn, a communication distance (a length of the space-side communication path) becomes short. Conversely, in a case where the smartphone 92 is held by a hand opposite to the hand on the side on which the wristband terminal 94 is worn, the communication distance (the length of the space-side communication path) becomes long. In such a case, a reception signal level is, for example, 1 mV in a case where the communication distance is short, but may be decreased to, for example 0.1 mV, or the like in a case where the communication distance is long.

Moreover, for example, consideration is given to a case of wearing the wristband terminal 94 in which the first communication apparatus 110 is mounted and performing communication with the door 90 in which the second communication apparatus 120 is mounted, as illustrated in FIG. 4. In this case, for example, the second human body electrode 121 of the second communication apparatus 120 is provided in the doorknob 91, and the second spatial electrode 122 is provided in a main body of the door. In this case, in a case where the doorknob 91 is touched by a hand on side on which the wristband terminal 94 is worn, a communication distance (the length of the space-side communication path) becomes short. Conversely, in a case where the doorknob 91 is touched by a hand opposite to the hand on the side on which the wristband terminal 94 is worn, the communication distance (the length of the space-side communication path) becomes long. In such a case, the reception signal level is, for example, 5 mV in a case where the communication distance is long, but may become, for example, a large signal level such as 50 mV in a case where the communication distance is short.

As described above, changing the communication distance in accordance with a usage condition may change the reception signal level. Moreover, the reception signal level may be changed by a size of a communication electrode mounted in each communication apparatus. For example, a communication electrode mounted in the door 90 may have, for example, a configuration larger than that of a communication electrode mounted in the smartphone 92. A size of a spatial electrode mounted in the door 90 may have, for example, a configuration larger than that of a spatial electrode mounted in the smartphone 92. Accordingly, in a case where communication is performed with the door 90, the reception signal level may be larger, as compared with a case where communication is performed with the smartphone 92.

Hence, in a case where communication with the smartphone 92, etc. on which a small spatial electrode is mounted is performed under such a condition that the communication distance becomes long, a reception signal may have a small reception signal level that is very close to a communication limit. Moreover, in a case where communication with the door 90, etc. on which a large spatial electrode is mounted is performed under such a condition that the communication distance becomes short, the reception signal level may become too large to cause saturation of the signal.

As described above, in the communication system with use of the electric field communication technology, a dynamic range of the reception signal level is large. Under a condition that the communication electrode is small and the communication distance is long, the reception signal level may become, for example, a signal level of about 0.1 mV. Conversely, under a condition that the communication electrode is large and the communication distance is short, the reception signal level may become, for example, a signal level of 100 mV or more.

Accordingly, as illustrated in FIG. 5, it is conceivable that a reception circuit has a configuration in which an AGC (Automatic Gain Control) circuit 22 is provided in an output stage of a LNA (low noise amplifier) 21. In order to ensure communication, the reception circuit is generally a circuit that ensures an SNR (Signal-to-Noise Ratio) by input of a small signal level; however, in doing so, input of a large signal level causes saturation of the signal. There is a possibility of solving this issue by the AGC circuit 22 to some, but limited, extent. Moreover, if the signal is saturated in a circuit in a stage previous to the AGC circuit 22, it is not possible to eliminate saturation of the signal by the AGC circuit 22.

For example, as illustrated in FIG. 5, output of the AGC circuit 22 becomes 100 mV as a specification. It is considered to cause the reception circuit to operate to have 0.1 mV at minimum as an input level of the reception signal to the LNA 21. It is assumed that a gain of the LNA 21 is 20 dB. In order to cause the output of the AGC circuit 22 to be 100 mV, 40 dB is necessary for a gain of the AGC circuit 22. In a case where a gain variable width of the AGC circuit 22 is 40 dB, a minimum AGC gain is 0 dB. In a case where the input level to the LNA 21 exceeds 10 mV at this time, the output of the AGC circuit 22 exceeds 100 mV. Accordingly, there is a possibility that the signal is saturated by input to the AGC circuit 22 or a circuit in a stage following the AGC circuit 22. Moreover, assuming that maximum output of the LNA 21 is 100 mV, if the input level exceeds 100 mV, the signal is saturated in the LNA 21.

As described above, it is desirable to develop a communication apparatus and a communication system that make it possible to correspond to a signal level having a large dynamic range.

Moreover, in the communication system with use of the electric field communication technology, adopting a large electrode, or the like may easily cause generation of a large voltage on reception side, thereby establishing communication before contact with a human body electrode of a communication partner. It is therefore desirable to develop technology that makes it possible to suppress communication performance on an as-needed basis.

1. First Embodiment

[1.1 Basic Configuration and Operation]

A communication apparatus according to the present embodiment is characterized by coupling, between a first electrode and a second electrode, of a series circuit including a capacity changeover switch and a capacitor that are coupled to each other in series. The first electrode may serve as a human body electrode. The second electrode may serve as a spatial electrode.

The communication apparatus according to the present embodiment may be applied to one or both of the first communication apparatus 110 and the second communication apparatus 120 in the communication system 100 according to the foregoing comparative example. Configurations of the communication apparatus and a communication system according to the present embodiment may be substantially similar to configurations of the communication apparatus and the communication system according to the comparative example illustrated in FIG. 1 described above, except for portions related to the series circuit including the capacity changeover switch and the capacitor described below. In the following, a case where the series circuit including the capacity changeover switch and the capacitor is applied to the second communication apparatus 120 is described as an example; however, a substantially similar configuration may be applied to the first communication apparatus 110. Moreover, the first communication apparatus 110 and the second communication apparatus 120 may serve as transceivers that bidirectionally transmit and receive data.

FIG. 6 schematically illustrates a first configuration example of the communication apparatus according to the first embodiment of the present disclosure.

The communication apparatus according to the present embodiment includes a transmission circuit unit 10, a transmission changeover switch 12, a reception circuit unit 20, a series circuit 40, a transmission-reception mode controller 41, and a switch controller 43. For example, at least the transmission circuit unit 10 and the reception circuit unit 20 of these components are provided in the second communication circuit unit 123 in FIG. 1.

Moreover, the communication apparatus according to the present embodiment includes the second human body electrode 121 as the first electrode and the second spatial electrode 122 as the second electrode. The second human body electrode 121 and the second spatial electrode 122 configure the second antenna unit 125 in FIG. 1.

The series circuit 40 disposed between the second antenna unit 125 and the second communication circuit unit 123 is coupled between the second human body electrode 121 and the second spatial electrode 122. The series circuit 40 includes a capacity changeover switch SW and a capacitor 42 that are coupled to each other in series.

The transmission circuit unit 10 outputs a transmission signal via the second human body electrode 121 and the second spatial electrode 122 in a transmission mode. The transmission circuit unit 10 includes a transmission driver 11.

The reception circuit unit 20 receives a reception signal via the second human body electrode 121 and the second spatial electrode 122 in a reception mode. The reception circuit unit 20 includes an LNA 21 and a reception signal processor 23.

The transmission changeover switch 12 is coupled between the transmission circuit unit 10 and both the second human body electrode 121 and the second spatial electrode 122. The transmission changeover switch 12 includes a switch that performs switching between the transmission mode and the reception mode.

The transmission-reception mode controller 41 controls switching between the transmission mode and the reception mode through controlling switching of the transmission changeover switch 12.

The switch controller 43 performs switching of the capacity changeover switch SW of the series circuit 40 to control switching whether or not to add a capacity between the second human body electrode 121 and the second spatial electrode 122.

The switch controller 43 performs switching of the capacity changeover switch SW on the basis of, for example, a signal level of the reception signal. Moreover, the switch controller 43 may perform switching of the capacity changeover switch SW on the basis of an external control signal.

The switch controller 43 may turn off the capacity changeover switch SW of the series circuit 40 in the transmission mode. Moreover, the switch controller 43 may turn on or off the capacity changeover switch SW of the series circuit 40 in the reception mode.

FIG. 7 schematically illustrates a second configuration example of the communication apparatus according to the present embodiment.

In the configuration example in FIG. 6, each of the second human body electrode 121 as the first electrode and the second spatial electrode 122 as the second electrode is coupled to the second communication circuit unit 123 including at least the transmission circuit unit 10 and the reception circuit unit 20, and performs transmission of a differential signal between the second antenna unit 125 and the second communication circuit unit 123.

In contrast, as in the configuration example in FIG. 7, the second spatial electrode 122 may be grounded, and a single-ended signal may be transmitted between the second human body electrode 121 and the second communication circuit unit 123.

FIG. 8 schematically illustrates a third configuration example of the communication apparatus according to the present embodiment.

The configuration examples in FIGS. 6 and 7 may each include a plurality of series circuits 40. In this case, a capacity value between the second human body electrode 121 and the second spatial electrode 122 may be switchable to any of a plurality of values through switching each of the capacity changeover switches SW in the plurality of series circuits 40. In this case, capacity values of the respective capacitors 42 in the plurality of series circuits 40 may be different from one another.

The switch controller 43 may allow the capacity value between the second human body electrode 121 and the second spatial electrode 122 to be switched to any of the plurality of values through independently controlling the respective capacity changeover switches SW in the plurality of series circuits 40.

For example, the switch controller 43 may perform switching of the capacity changeover switches SW to decrease the capacity value between the second human body electrode 121 and the second spatial electrode 122 in a case where the signal level of the reception signal is equal to or smaller than a predetermined minimum value, and increase the capacity value between the second human body electrode 121 and the second spatial electrode 122 in a case where the signal level of the reception signal is equal to or larger than a predetermined maximum value.

FIG. 8 illustrates a configuration example in which a first series circuit 40A, a second series circuit 40B, and a third series circuit 40C are provided as the plurality of series circuit 40 in the configuration example in FIG. 6.

The first series circuit 40A includes a capacity changeover switch SW1 and a first capacitor 42A that are coupled to each other in series. The second series circuit 40B includes a second capacity changeover switch SW2 and a second capacitor 42B that are coupled to each other in series. The third series circuit 40C includes a third capacity changeover switch SW3 and a third capacitor 42C that are coupled to each other in series.

Assuming that a capacity value of the first capacitor 42A is C, for example, a capacity value of the second capacitor 42B may be 2 C, and a capacity value of the third capacitor 42C may be 4 C.

FIG. 9 illustrates an example of a range of a circuit portion to be incorporated in an IC (Integrated Circuit) in the communication apparatus according to the present embodiment.

In the configuration examples in FIGS. 6 and 7, at least the capacity changeover switch SW of the capacity changeover switch SW and the capacitor 42 may be provided together with the second communication circuit unit 123 in one semiconductor apparatus.

In a case of the configuration example in FIG. 8, for example, as illustrated in FIG. 9, a first circuit portion 301 may be configured as one semiconductor apparatus. Alternatively, a second circuit portion 302 may be configured as one semiconductor apparatus. Alternatively, a third circuit portion 303 may be configured as one semiconductor apparatus.

Herein, the first circuit portion 301 may include the transmission circuit unit 10, the transmission changeover switch 12, the reception circuit unit 20, and the transmission-reception mode controller 41.

The second circuit portion 302 may include, in addition to the first circuit portion 301, the switch controller 43 and the first to third capacity changeover switches SW1, SW2, and SW3.

The third circuit portion 303 may include, in addition to the second circuit portion 302, the first to third capacitors 42A, 42B, and 42C.

(Relationship between Capacity Value between Electrodes and Reception Signal Level)

Description is given of a relationship between a capacity value between electrodes and a reception signal level in the communication apparatus according to the present embodiment with reference to FIG. 10.

It is possible to represent, by an equivalent circuit in a lower section of FIG. 10, a circuit between the first antenna unit 115 (the first human body electrode 111 and the first spatial electrode 112) and the second antenna unit 125 (the second human body electrode 121 and the second spatial electrode 122) in the communication system 100 according to the foregoing comparative example. Herein, Va represents a transmission signal level, Vb represents an input signal level (a reception signal level), and Ca represents a spatial capacity value. Cb represents an input capacity value between the second human body electrode 121 and the second spatial electrode 122 (a capacity value between reception electrodes).

An impedance of the human body 30 is about two orders of magnitude lower than the spatial capacity value Ca; therefore, even if the human body 30 is regarded as a short circuit, an error is small. Accordingly, it is possible to represent a circuit in an upper section of FIG. 10 by the equivalent circuit in the lower section of FIG. 10. In this case, Vb/Va is represented by the following expression.

$$Vb/Va = Ca/(Ca+Cb)$$

Herein, the spatial capacity value Ca is sufficiently smaller than the input capacity value Cb; therefore, Vb/Va is approximated as represented by the following expression.

$$Vb/Va \approx Ca/Cb$$

In other words, the reception signal level Vb is inversely proportional to the input capacity value Cb. In a case where Cb is doubled, the reception signal level Vb becomes ½.

Namely, increasing the input capacity value Cb makes it possible to decrease the reception signal level Vb. Conversely, decreasing the input capacity value Cb makes it possible to increase the reception signal level Vb.

Accordingly, in the circuits illustrated in FIGS. 6 to 8, changing the capacity value between the electrodes makes it possible to change the reception signal level. In other words, for example, in the circuit in FIG. 6, turning on the capacity changeover switch SW to add a capacity by the capacitor 42 between the second human body electrode 121 and the second spatial electrode 122 makes it possible to decrease the reception signal level, as compared with a case where the capacity changeover switch SW is turned off.

[1.2 Control Operation]

In the communication apparatus according to the present embodiment, control, by the switch controller 43, of switching of the capacity to be added between the electrodes may be performed on the basis of the external control signal, for example, as illustrated in FIG. 11. The external control signal may include a setting signal by a user or a control signal based on, for example, a communication distance, etc. In this case, after control of switching is performed on the basis of the external control signal, the switch controller 43 may fix the capacity changeover switch to fix the capacity value to be added between the electrodes.

Moreover, the communication apparatus according to the present embodiment may further include a signal level detector 44, for example, as illustrated in FIG. 12. The signal level detector 44 may detect a signal level of a reception signal outputted from the LNA 21. The switch controller 43 may perform control of switching of the capacity to be added between the electrodes on the basis of the reception signal level detected by the signal level detector 44.

FIG. 13 illustrates a correspondence relation between states of the first to third capacity changeover switches SW1, SW2, and SW3 and the capacity value in the circuit configuration example illustrated in FIG. 12. FIG. 13 illustrates an example in which the capacity value of the first capacitor 42A is C, the capacity value of the second capacitor 42B is 2 C, and the capacity value of the third capacitor 42C is 4 C.

As illustrated in FIG. 13, the switch controller 43 is allowed to change a combined capacity of the first to third capacitors 42A, 42B, and 42C to a value within a range from 0 to 7 C by switching of the first to third capacity changeover switches SW1, SW2, and SW3.

Herein, it is assumed that V1 represents a minimum setting value of the reception signal level and V2 represents a maximum setting value of the reception signal level. For example, the switch controller 43 may perform control of switching of the capacity value to turn the reception signal level to a level within a range from V1 to V2 both inclusive. For example, the switch controller 43 may control the first to third capacity changeover switches SW1, SW2, and SW3 to decrease the capacity value by one step in a case where the reception signal level is smaller than V1. Moreover, the switch controller 43 may control the first to third capacity changeover switches SW1, SW2, and SW3 to increase the capacity value by one step in a case where the reception signal level is larger than V2. Thus, the reception signal level is automatically turned to a level within a range from V1 to V2 both inclusive.

FIG. 14 illustrates an example of a flow of control of switching of the capacity on the basis of the reception signal level.

FIG. 14 illustrates an example in which in the circuit configuration in FIG. 12, the states of the first to third capacity changeover switches SW1, SW2, and SW3 are controlled by a switching setting value ssw illustrated in FIG. 13 on the basis of the reception signal level to switch the capacity to be added between the electrodes. It is to be noted that Esig represents a reception signal level detected by the signal level detector 44.

The switch controller 43 first sets the switching setting value ssw to an initial value (=0) (step S101). Next, the switch controller 43 determines whether or not the reception signal level Esig detected by the signal level detector 44 is larger than the minimum setting value V1 (step S102).

In a case where the reception signal level Esig is equal to or smaller than the minimum setting value V1 (step S102;

N), the switch controller 43 next determines whether or not the switching setting value ssw is a minimum value (=0) (step S103). In a case where the switching setting value ssw is the minimum value (step S103; Y), the switch controller 43 returns to a process in the step S102. In a case where the switching setting value ssw is not the minimum value (step S103; N), the switch controller 43 next decreases the switching setting value ssw by one step (step S104), and returns to the process in the step S102.

In contrast, in a case where the reception signal level Esig is larger than the minimum setting value V1 (step S102; Y), the switch controller 43 next determines whether or not the reception signal level Esig detected by the signal level detector 44 is smaller than the maximum setting value V2 (step S105). In a case where the reception signal level Esig is smaller than the maximum setting value V2 (step S105; Y), the switch controller 43 returns to the process in the step S102.

In a case where the reception signal level Esig is equal to or larger than the maximum setting value V2 (step S105; N), the switch controller 43 next determines whether or not the switching setting value ssw is a maximum value (=7) (step S106). In a case where the switching setting value ssw is the maximum value (step S106; Y), the switch controller 43 returns to the process in the step S102.

In a case where the switching setting value ssw is not the maximum value (step S106; N), the switch controller 43 next increases the switching setting value ssw by one step (step S107), and returns to the process in the step S102.

FIG. 15 schematically illustrates an example of control of switching between the transmission mode and the reception mode. In the following, the configuration example in FIG. 6 is described as an example.

The transmission-reception mode controller 41 and the switch controller 43 monitor switching between the transmission mode and the reception mode (step S201). In a case where switching between the transmission mode and the reception mode has been performed (step S201; Y), the transmission-reception mode controller 41 and the switch controller 43 determines whether or not the switching is switching to the transmission mode (step S202).

In a case where the switching is switching to the transmission mode (step S202; Y), first, the switch controller 43 turns off the capacity changeover switch SW (step S203). Thereafter, the transmission-reception mode controller 41 turns on the transmission changeover switch 12 (step S204), and the flow returns to a process in the step S201.

In contrast, in a case where the switching is switching to the reception mode (step S202; N), first, the transmission-reception mode controller 41 turns off the transmission changeover switch 12 (step S205). Thereafter, the capacity changeover switch SW turns on the capacity changeover switch SW (step S206), and the flow returns to the process in the step S201.

[1.3 Effects]

As described above, according to the present embodiment, it is possible to selectively add the capacity between the electrodes configuring the antenna unit of the communication apparatus, which makes it possible to suppress degradation in communication performance due to change in the communication environment.

According to the present embodiment, adding the capacity between the electrodes configuring the antenna unit of the communication apparatus makes it possible to decrease the reception signal level. Adding the capacity under such a condition that the reception signal is excessively large makes it possible to prevent saturation of the signal by the reception circuit.

Moreover, according to the present embodiment, observing the reception signal level and switching to any of a plurality of capacities makes it possible to execute an operation corresponding to an AGC circuit. This makes it possible to simplify the existing AGC circuit (reduce a dynamic range) or eliminate the existing AGC circuit.

Further, technology according to the present embodiment is usable even for purposes such as a purpose of limiting communication performance in a case where adopting a large electrode easily causes generation of a large voltage on the reception side, thereby establishing communication before contact with a human body electrode of a communication partner.

It is to be noted that the effects described in the description are merely illustrative and non-limiting, and other effects may be included. This also applies to effects achieved by the following other embodiments.

2. Second Embodiment (Practical Application Example)

The technology according to the present disclosure is applicable to various products. For example, the technology according to the present disclosure may be achieved in the form of an apparatus to be mounted to a mobile body of any kind. Examples of the mobile body include an automobile, an electric vehicle, a hybrid electric vehicle, a motorcycle, a bicycle, a personal mobility, an airplane, an unmanned aerial vehicle, a vessel, a robot, a construction machine, an agricultural machine (a tractor), etc.

It is to be noted that in the following description, each of GSM and HDMI is a registered trademark.

FIG. 16 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 16, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay, or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 16 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

FIG. 17 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 17 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 16, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM), worldwide interoperability for microwave access (WiMAX), long term evolution (LTE)), LTE-advanced (LTE-A), or the like, or another wireless communication protocol such as wireless LAN (referred to also as wireless fidelity (Wi-Fi), Bluetooth, or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth, near field communication (NFC), or wireless universal serial bus (WUSB). In addition, the in-vehicle device I/F 7660 may establish wired connection by universal serial bus (USB), high-definition multimedia interface (HDMI), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 16, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 16 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

In the vehicle control system 7000 described above, the communication apparatus and the communication system of the present disclosure are applicable to communication with the external environment 7750 of a terminal, etc. present in proximity to the vehicle via the general-purpose communication I/F 7620, for example. Moreover, the communication apparatus and the communication system of the present disclosure are applicable to communication with the in-vehicle devices 7760 such as a mobile device and a wearable device possessed by the occupant via the in-vehicle device I/F 7660.

3. Other Embodiments

Although the technology achieved by the present disclosure is not limited to description of the foregoing respective embodiments, and may be modified in a variety of ways.

For example, the present technology may have the following configurations.

(1)
A communication apparatus including:
an antenna unit including a first electrode and a second electrode;
a communication circuit unit that performs communication using a human body as a communication medium via the antenna unit; and
a series circuit including a switch and a capacitor that are coupled to each other in series, and coupled between the first electrode and the second electrode.

(2)
The communication apparatus according to (1), further including a switch controller that performs switching of the switch in the series circuit.

(3)
The communication apparatus according to (2), in which the switch controller performs switching of the switch on the basis of a signal level of a reception signal.

(4)
The communication apparatus according to (2), in which the switch controller performs switching of the switch on the basis of an external control signal.

(5)
The communication apparatus according to any one of (2) to (4), in which the switch controller turns off the switch in the series circuit in a case where a signal is to be transmitted via the antenna unit.

(6)
The communication apparatus according to (1), in which
a plurality of the series circuits are included, and
a capacity value between the first electrode and the second electrode is switchable to any of a plurality of values by switching of the switch in each of the plurality of series circuits.

(7)
The communication apparatus according to (6), in which capacity values of the respective capacitors in the plurality of series circuits are different from one another.

(8)
The communication apparatus according to (6) or (7), further including a switch controller that performs switching of the switch to decrease the capacity value between the first electrode and the second electrode in a case where a signal level of a reception signal is equal to or smaller than a predetermined minimum value, and increase the capacity value between the first electrode and the second electrode in a case where the signal level of the reception signal is equal to or larger than a predetermined maximum value.

(9)
The communication apparatus according to any one of (1) to (8), in which each of the first electrode and the second electrode is coupled to the communication circuit unit, and a differential signal is transmitted between the antenna unit and the communication circuit unit.

(10)
The communication apparatus according to any one of (1) to (8), in which the first electrode is coupled to the communication circuit unit, and the second electrode is grounded.

(11)
The communication apparatus according to any one of (1) to (10), in which at least the switch of the switch and the capacitor is provided together with the communication circuit unit inside one semiconductor apparatus.

(12)
The communication apparatus according to (11), in which the switch and the capacitor are provided together with the communication circuit unit inside the one semiconductor apparatus.

(13)
A communication system including:
a first communication apparatus; and
a second communication apparatus that performs communication using a human body as a communication medium with the first communication apparatus,
at least one of the first communication apparatus and the second communication apparatus including:
an antenna unit including a first electrode and a second electrode,
a communication circuit unit that performs communication using a human body as a communication medium via the antenna unit, and
a series circuit including a switch and a capacitor that are coupled to each other in series, and coupled between the first electrode and the second electrode.

This application claims the benefit of Japanese Priority Patent Application No. 2016-178404 filed with the Japan Patent Office on Sep. 13, 2016, the entire contents of which are incorporated herein by reference.

It should be understood by those skilled in the art that various modifications, combinations, sub-combinations and alterations may occur depending on design requirements and other factors insofar as they are within the scope of the appended claims or the equivalents thereof.

The invention claimed is:
1. A communication apparatus, comprising:
an antenna unit including a first electrode and a second electrode;
a communication circuit unit configured to communicate via the antenna unit, wherein a communication medium for the communication is a human body;
a plurality of series circuits that includes a plurality of switches and a plurality of capacitors, wherein
each series circuit of the plurality of series circuits includes a respective switch of the plurality of switches coupled to a respective capacitor of the plurality of capacitors, in series, and
the plurality of switches and the plurality of capacitors are between the first electrode and the second electrode;
a transmission changeover switch between the communication circuit unit and the antenna unit, wherein
the transmission changeover switch is configured to control the communication apparatus to:
switch from a transmission mode of the communication apparatus to a reception mode of the communication apparatus; and
switch from the reception mode to the transmission mode, and
the transmission changeover switch is different from the plurality of switches; and
a switch controller configured to:
turn off the plurality of switches based on the switch from the reception mode to the transmission mode of the communication apparatus, wherein the plurality of switches is turned off for transmission of a signal via the antenna unit;
turn on the plurality of switches based on the switch from the transmission mode to the reception mode of the communication apparatus; and control at least one switch of the plurality of switches to one of:
  decrease a capacity value between the first electrode and the second electrode, based on a signal level of a reception signal that is one of equal to or smaller than a first threshold value, or
  increase the capacity value based on the signal level that is one of equal to or larger than a second threshold value, wherein
    the first threshold value is different from the second threshold value,
    the at least one switch of the plurality of switches is controlled based on an external control signal, and
    the external control signal is a user setting signal.

2. The communication apparatus according to claim 1, wherein
  the plurality of capacitors has a plurality of capacity values,
  each capacitor of the plurality of capacitors corresponds to a respective capacity value of the plurality of capacity values, and
  capacity values of the plurality of capacity values are different.

3. The communication apparatus according to claim 1, wherein
  each of the first electrode and the second electrode is coupled to the communication circuit unit, and
  the communication circuit unit is further configured to communicate with the antenna unit by a differential signal.

4. The communication apparatus according to claim 1, wherein
  the first electrode is coupled to the communication circuit unit, and
  the second electrode is grounded.

5. The communication apparatus according to claim 1, further comprising one semiconductor apparatus that includes:
  the plurality of switches of the plurality of series circuits; and
  the communication circuit unit.

6. The communication apparatus according to claim 5, wherein the one semiconductor apparatus further includes the plurality of capacitors of the plurality of series circuits.

7. The communication apparatus according to claim 1, wherein the transmission changeover switch includes:
  a first switch connected to the first electrode; and
  a second switch connected to the second electrode.

8. The communication apparatus according to claim 1, further comprising a transmission-reception mode controller configured to switch on the transmission changeover switch based on the turn off of the plurality of switches.

9. A communication system, comprising:
  a first communication apparatus; and
  a second communication apparatus configured to communicate with the first communication apparatus, wherein
    a communication medium for the communication with the first communication apparatus is a human body, and
    at least one of the first communication apparatus or the second communication apparatus includes:
      an antenna unit including a first electrode and a second electrode;
      a communication circuit unit configured to communicate via the antenna unit;
      a plurality of series circuits that includes a plurality of switches and a plurality of capacitors, wherein
        each series circuit of the plurality of series circuits includes a respective switch of the plurality of switches coupled to a respective capacitor of the plurality of capacitors, in series, and
        the switch plurality of switches and the capacitor plurality of capacitors are between the first electrode and the second electrode;
      a transmission changeover switch between the communication circuit unit and the antenna unit, wherein
        the transmission changeover switch is configured to control the at least one of the first communication apparatus or the second communication apparatus to:
          switch from a transmission mode of the at least one of the first communication apparatus or the second communication apparatus, to a reception mode of the at least one of the first communication apparatus or the second communication apparatus; and
          switch from the reception mode to the transmission mode, and
        the transmission changeover switch is different from the plurality of switches; and
      a switch controller configured to:
        turn off the plurality of switches based on the switch from the reception mode to the transmission mode of the at least one of the first communication apparatus or the second communication apparatus, wherein the plurality of switches is turned off for transmission of a signal via the antenna unit;
        turn on the plurality of switches based on the switch from the transmission mode to the reception mode of the at least one of the first communication apparatus or the second communication apparatus; and
        control at least one switch of the plurality of switches to one of:
          decrease a capacity value between the first electrode and the second electrode, based on a signal level of a reception signal that is one of equal to or smaller than a first threshold value, or
          increase the capacity value based on the signal level that is one of equal to or larger than a second threshold value, wherein
            the first threshold value is different from the second threshold value,
            the at least one switch of the plurality of switches is controlled based on an external control signal, and
            the external control signal is a user setting signal.

* * * * *